United States Patent
Wu

(10) Patent No.: US 9,352,856 B1
(45) Date of Patent: May 31, 2016

(54) AXIALLY GROOVED CROSSING HEAT PIPES

(71) Applicant: Space Systems/Loral, LLC, Palo Alto, CA (US)

(72) Inventor: Gordon Wu, Sunnyvale, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 439 days.

(21) Appl. No.: 14/097,020

(22) Filed: Dec. 4, 2013

(51) Int. Cl.
*B64G 1/52* (2006.01)
*B64G 1/50* (2006.01)
*G01M 17/00* (2006.01)

(52) U.S. Cl.
CPC .............. *B64G 1/503* (2013.01); *G01M 17/00* (2013.01)

(58) Field of Classification Search
None
See application file for complete search history.

(56) References Cited

U.S. PATENT DOCUMENTS

| | | | | |
|---|---|---|---|---|
| 4,687,048 A | * | 8/1987 | Edelstein et al. | 165/301 |
| 4,899,810 A | * | 2/1990 | Fredley | 165/41 |
| 5,069,274 A | * | 12/1991 | Haslett et al. | 165/272 |
| 5,117,901 A | * | 6/1992 | Cullimore | 165/86 |
| 5,351,746 A | * | 10/1994 | Mackey et al. | 165/41 |
| 5,624,088 A | * | 4/1997 | Fiore | 244/158.1 |
| 5,732,765 A | * | 3/1998 | Drolen et al. | 165/41 |
| 5,735,489 A | * | 4/1998 | Drolen et al. | 244/171.8 |
| 5,743,325 A | * | 4/1998 | Esposto | 165/41 |
| 5,787,969 A | * | 8/1998 | Drolen et al. | 165/41 |
| 5,794,890 A | * | 8/1998 | Jones et al. | 244/171.8 |
| 5,806,800 A | * | 9/1998 | Caplin | 244/171.8 |
| 5,806,803 A | * | 9/1998 | Watts | 244/171.8 |
| 5,823,477 A | * | 10/1998 | York | 244/171.8 |
| 5,833,175 A | * | 11/1998 | Caplin | 244/158.1 |
| 5,870,063 A | * | 2/1999 | Cherrette et al. | 343/853 |
| 5,884,868 A | * | 3/1999 | Long et al. | 244/171.8 |
| 6,073,887 A | * | 6/2000 | Hosick | 244/171.8 |
| 6,073,888 A | * | 6/2000 | Gelon et al. | 244/171.8 |
| 6,080,962 A | * | 6/2000 | Lee | 219/209 |
| 6,378,809 B1 | * | 4/2002 | Pon | 244/171.8 |
| 6,776,220 B1 | * | 8/2004 | Low et al. | 165/41 |
| 7,036,772 B2 | * | 5/2006 | Walker et al. | 244/171.8 |
| 7,048,233 B2 | * | 5/2006 | Combes et al. | 244/171.8 |
| 7,080,681 B2 | * | 7/2006 | Wert | 165/104.21 |
| 7,174,950 B2 | | 2/2007 | Jacque et al. | |
| 7,513,462 B1 | * | 4/2009 | McKinnon et al. | 244/173.1 |
| 8,240,612 B2 | | 8/2012 | Jondean et al. | |

(Continued)

OTHER PUBLICATIONS

D. Bugby et al. (2009) "Thermal Management Architecture for Future Responsive Spacecraft", CP1103, Space, Propulsion & Energy Sciences International Forum—SPESIF-2009, edited by G. A. Robertson, American Institute of Physics 978-0-7354-06391/09, 10 pages.

*Primary Examiner* — Medhat Badawi
(74) *Attorney, Agent, or Firm* — Weaver Austin Villeneuve & Sampson LLP

(57) ABSTRACT

A spacecraft includes substantially parallel first radiator and second radiator panels, and a transverse panel coupled, having a width, W, coupled therebetween. The spacecraft also includes a first heat pipe having a first section parallel and proximate to the first radiator panel and a second section parallel and proximate to the transverse panel, a second heat pipe having a first section parallel and proximate to the second radiator panel and a second section parallel and proximate to the transverse panel and a third heat pipe, proximate and parallel to the transverse panel, the second section of the first heat pipe, and the second section of the second heat pipe. The third heat pipe has a length, L, substantially greater than W/2.

16 Claims, 6 Drawing Sheets

(56) References Cited

U.S. PATENT DOCUMENTS

| | | | |
|---|---|---|---|
| 8,616,271 B2* | 12/2013 | Hugon et al. | 165/202 |
| 2002/0145082 A1* | 10/2002 | Bertheux et al. | 244/163 |
| 2002/0153128 A1* | 10/2002 | Low et al. | 165/104.14 |
| 2004/0040691 A1* | 3/2004 | Jacque et al. | 165/42 |
| 2004/0188568 A1* | 9/2004 | Gayrard et al. | 244/163 |
| 2004/0232284 A1* | 11/2004 | Tjiptahardja et al. | 244/163 |
| 2005/0166399 A1* | 8/2005 | Kroliczek et al. | 29/890.07 |
| 2005/0211850 A1* | 9/2005 | Sebata et al. | 244/171.8 |
| 2007/0221787 A1* | 9/2007 | McKinnon et al. | 244/171.8 |
| 2008/0143636 A1* | 6/2008 | Couchman et al. | 343/915 |
| 2008/0206534 A1* | 8/2008 | Brooks | 428/220 |
| 2009/0080155 A1* | 3/2009 | Takahashi et al. | 361/695 |
| 2009/0090490 A1* | 4/2009 | Yoshida et al. | 165/104.33 |
| 2009/0200006 A1* | 8/2009 | Kroliczek et al. | 165/274 |
| 2010/0001141 A1* | 1/2010 | Jondeau et al. | 244/158.1 |
| 2010/0243817 A1* | 9/2010 | McKinnon et al. | 244/171.8 |
| 2013/0112374 A1* | 5/2013 | Murray et al. | 165/104.26 |
| 2013/0200220 A1* | 8/2013 | Goodzeit et al. | 244/171.8 |
| 2013/0200221 A1* | 8/2013 | Goodzeit et al. | 244/171.8 |
| 2013/0233515 A1* | 9/2013 | Aston | 165/104.21 |
| 2013/0233516 A1* | 9/2013 | Aston et al. | 165/104.21 |
| 2014/0083651 A1* | 3/2014 | Chaix et al. | 165/104.21 |
| 2014/0224939 A1* | 8/2014 | Wong et al. | 244/171.8 |
| 2014/0268553 A1* | 9/2014 | Van Pelt et al. | 361/679.52 |

* cited by examiner

AXIALLY GROOVED CROSSING HEAT PIPES

TECHNICAL FIELD

This invention relates generally to spacecraft radiator system, and, more particularly, an improved spacecraft radiator system including crossing heat pipes.

BACKGROUND OF THE INVENTION

The assignee of the present invention manufactures and deploys spacecraft for, inter alia, communications and broadcast services from geostationary orbit. The present invention relates to a spacecraft radiator system including a crossing heat pipe system that utilizes heat pipes to thermally couple radiator panels on a satellite or spacecraft equipment panels that may or may not radiate to space. The heat pipes are used to transfer and distribute thermal energy from heat sources such as operating electronic heat dissipating units to and across radiator panel surfaces from where it may be radiated into space. When the spacecraft is operating on-orbit, the radiator panels, generally, will be disposed in a north or south facing direction, because the north or south panels experience a solar radiation exposure that is relatively benign and stable compared to non-radiating panels. Non-radiating equipment panels may be interior to the spacecraft and/or face in an east/west or Earth/anti-Earth direction and experience significant diurnal cycles as the spacecraft orbits the Earth.

A better appreciation of the presently disclosed techniques may be obtained by referring first to FIG. 1 which illustrates some typical features of a known spacecraft radiator system including crossing heat pipes. For clarity of illustration, a simplified view of a spacecraft radiator system 30 is illustrated that omits spacecraft components not directly related to the spacecraft radiator system. The illustrated spacecraft radiator system 30 includes North radiator panel 11a and South radiator panel 11b. A transverse panel 12 is disposed between and structurally coupled with North radiator panel 11a and South radiator panel 11b. The transverse panel 12 may be, as shown in the illustrated example, orthogonal to the spacecraft yaw axis and may, accordingly, be facing in the Earth or anti-Earth direction. The presently disclosed techniques also contemplate that the transverse panel 12 may be parallel to the spacecraft yaw axis, in which case the transverse panel 12 may be referred to as an East/West panel.

A number of parallel heat pipes 15 may be disposed such that transverse panel 12 is thermally coupled with North radiator panel 11a and with South radiator panel 11b. More particularly, a heat pipe 15 may be configured in an 'L' shape such that a first section 151 is thermally coupled with North radiator panel 11a or South radiator panel 11b and a second section 152 is thermally coupled with the transverse panel 12. As illustrated, the first section 151 may be disposed near or within North radiator panel 11a and the second section 152 transverse to the first section 151 may be disposed near or within transverse panel 12. Heat dissipating components and equipment 19 may be mounted on the inner panel surfaces 17 of the North radiator panel 11a, the South radiator panel 11b and/or the transverse panel 12.

A transverse section 152a of heat pipe 15a extending from the North radiator panel 11a is illustrated as being adjacent to a transverse section 152b of heat pipe 15b extending from the South radiator panel 11b. The adjacent transverse sections 152a and 152b may be said to overlap and may be respectively thermally coupled. Additionally, the transverse sections 152a and 152b may be used to transfer thermal energy between heat dissipating units mounted on the transverse panel 12 on the one hand and the North and/or South radiator panels on the other hand.

Referring to View A-A, it may be observed that an axial cross section of heat pipe 152 includes axial grooves, disposed between fins or splines 153. Each heat pipe typically constitutes a closed, self-contained vessel filled with a predetermined amount of an appropriate fluid, such as ammonia, toluene, or a water/isopropyl alcohol mixture. The fluid in the heat pipe members may be in a partially liquid and a partially gaseous state. The extent and location of liquid state fluid and gaseous state fluid will depend on the temperature of environments to which various parts of the heat pipe are exposed.

In a zero-g environment, as experienced on orbit, capillary action is effective to transport liquid state fluids along the axial length of the heat pipe. As a result, heat transfer between heat dissipating units and north/south radiator panels may be relatively efficient.

In a 1-g environment, as experienced during spacecraft ground testing, capillary action is not effective to the extent that the axial length of a heat pipe is inclined relative to horizontal. As a result, during ground testing, liquid state fluid tends to "puddle" in the lower portions of the heat pipe. More particularly, referring now to FIG. 2, when the spacecraft radiator system 30 is oriented with North radiator panel 11a vertically above South radiator panel 11b, a lower region of transverse panel 12 includes heat pipes with wetted portions and an upper region of transverse panel 12 includes only heat pipes without wetted portions. For example, as maybe observed in view B-B only the lower portion of heat pipe 15a and heat pipe 15b is wetted. Similarly, when the spacecraft is oriented with South radiator panel 11b vertically above North radiator panel 11a, an upper region of transverse panel 12 includes only heat pipes without wetted portions.

Consequently, heat dissipating units are conventionally disposed only proximate to the north/south mid-point of the transverse panel, within approximate region 120, so as to ensure that heat dissipating units are always proximate to a wetted portion of at least one heat pipe. Otherwise, operation of heat dissipating units during ground, functional and environmental testing, for example, may result in overheating of such heat dissipating units.

As a result, an improved approach to crossing heat pipe design is desirable.

SUMMARY

The present disclosure contemplates an improved configuration of a spacecraft radiator system that permits safe operation of heat dissipating units in a 1-g environment irrespective of an orientation of the spacecraft.

In an implementation, a spacecraft includes a first radiator panel, a second radiator panel, substantially parallel to the first radiator panel, and a transverse panel coupled at a first edge with the first radiator panel, and coupled at a second edge to the second radiator panel, the transverse panel being substantially orthogonal to the first radiator panel and the second radiator panel and having a width, W, between the first edge and the second edge. The spacecraft also includes a first heat pipe having a first section parallel and proximate to the first radiator panel and a second section parallel and proximate to the transverse panel, a second heat pipe having a first section parallel and proximate to the second radiator panel and a second section parallel and proximate to the transverse panel and a third heat pipe, proximate and parallel to the transverse panel, the second section of the first heat pipe, and the second section of the second heat pipe. The third heat pipe has a length, L, substantially greater than W/2.

In a further implementation, each heat pipe may be configured to contain a heat transfer fluid that is partially in a liquid state and partially in a gaseous state. Each of a first wetted portion of the first heat pipe, a second wetted portion of the second heat pipe and a third wetted portion of the third heat pipe may have fluid in the liquid state. Substantially all of the transverse panel may be proximate to at least one of the first wetted portion, the second wetted portion and the third wetted portion. Each of the second section of the first heat pipe and the second section of the second heat pipe may be approximately L/2 in length. A first internal volume of the first section of the first heat pipe may be approximately equal to a second internal volume of the second section first heat pipe. A third internal volume of the first section of the first heat pipe may be approximately equal to a fourth internal volume of the second section first heat pipe.

In another implementation, L may be approximately equal to W.

In a still further implementation, the transverse panel may enclose one or more of the second section of the first heat pipe, the second section of the second heat pipe, and the third heat pipe. The transverse panel may enclose each of the second section of the first heat pipe, the second section of the second heat pipe, and the third heat pipe.

Some implementations, the spacecraft may also include a plurality of heat dissipating units disposed on at least a first surface of the transverse panel, at least one of the heat dissipating units being disposed proximate to the first radiator panel or the second radiator panel. The plurality of heat dissipating units may include one or more of a low noise amplifier, an up converter, and a down converter. The spacecraft may be configured to be tested, while the heat dissipating unit is operating, in a 1-g field irrespective of whether a substantial vertical distance separates the first radiator panel from the second radiator panel. The spacecraft may be configured to be tested in a 1-g field irrespective of whether the third heat pipe is substantially inclined with respect to horizontal.

In another implementation, the transverse panel may be orthogonal to a yaw axis of the spacecraft. Alternatively, the transverse panel may be parallel to a yaw axis of the spacecraft.

Implementation, a method of testing a spacecraft including at least one heat dissipating unit includes configuring the spacecraft for testing in a 1-g environment, where the spacecraft includes a first radiator panel, a second radiator panel, substantially parallel to the first radiator panel, a transverse panel coupled at a first edge with the first radiator panel, and coupled at a second edge to the second radiator panel, the transverse panel being substantially orthogonal to the first radiator panel and the second radiator panel and having a width, W, between the first edge and the second edge. The spacecraft further includes a first heat pipe having a first section parallel and proximate to the first radiator panel and a second section parallel and proximate to the transverse panel, a second heat pipe having a first section parallel and proximate to the second radiator panel and a second section parallel and proximate to the transverse panel and a third heat pipe, proximate and parallel to the transverse panel, the second section of the first heat pipe, and the second section of the second heat pipe. The heat dissipating unit is disposed on a first surface of the transverse panel, proximate to the first radiator panel or the second radiator panel. Configuring the spacecraft for testing in a 1-g environment includes orienting the spacecraft such that the third heat pipe is substantially inclined with respect to horizontal; and operating the heat dissipating unit in 1-g field.

BRIEF DESCRIPTION OF THE DRAWINGS

Features of the invention are more fully disclosed in the following detailed description of the preferred embodiments, reference being had to the accompanying drawings, in which.

Figure 1:
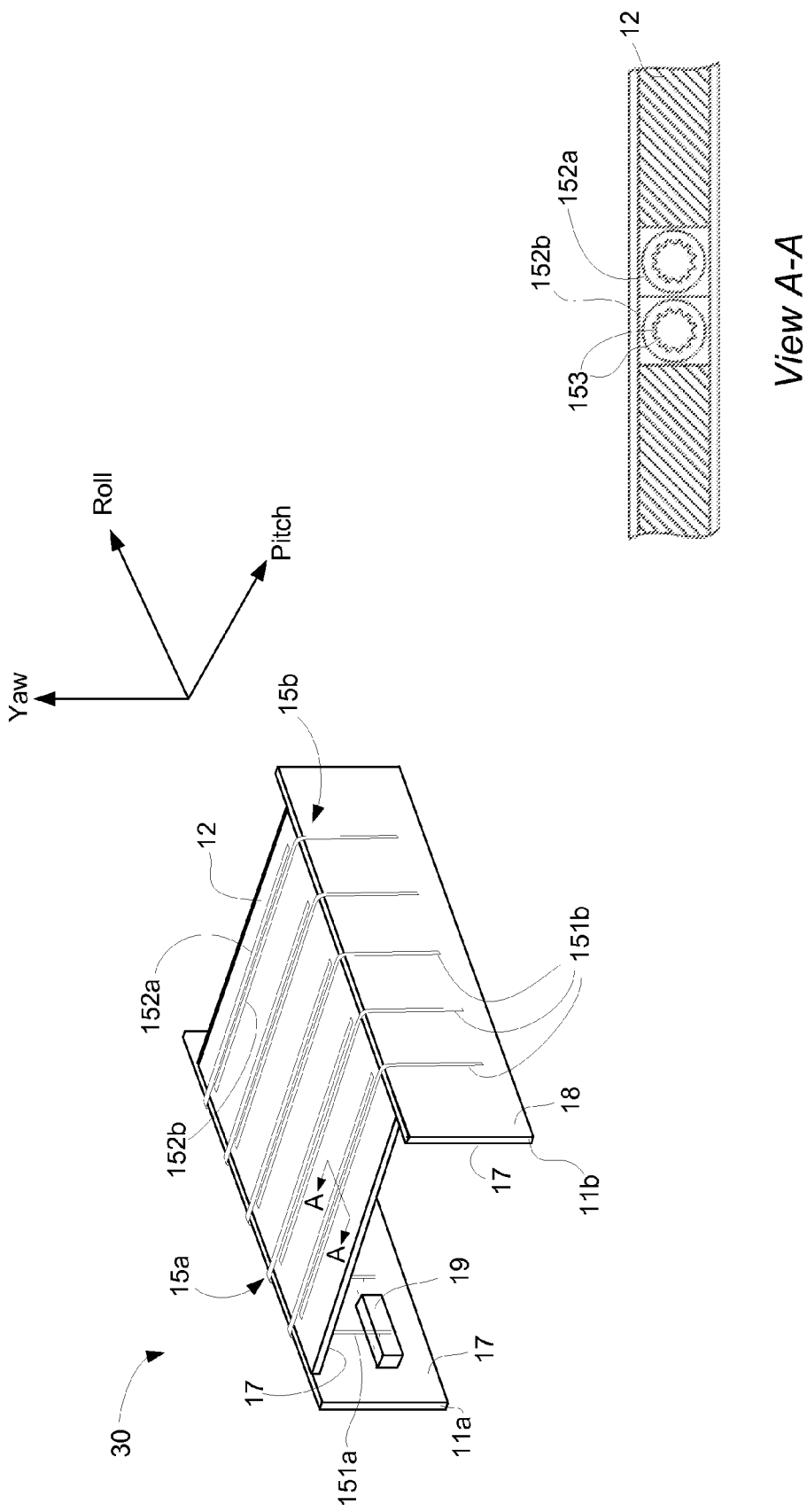
FIG. 1 illustrates some typical features of a known spacecraft radiator system including crossing heat pipes.
Figure 2:
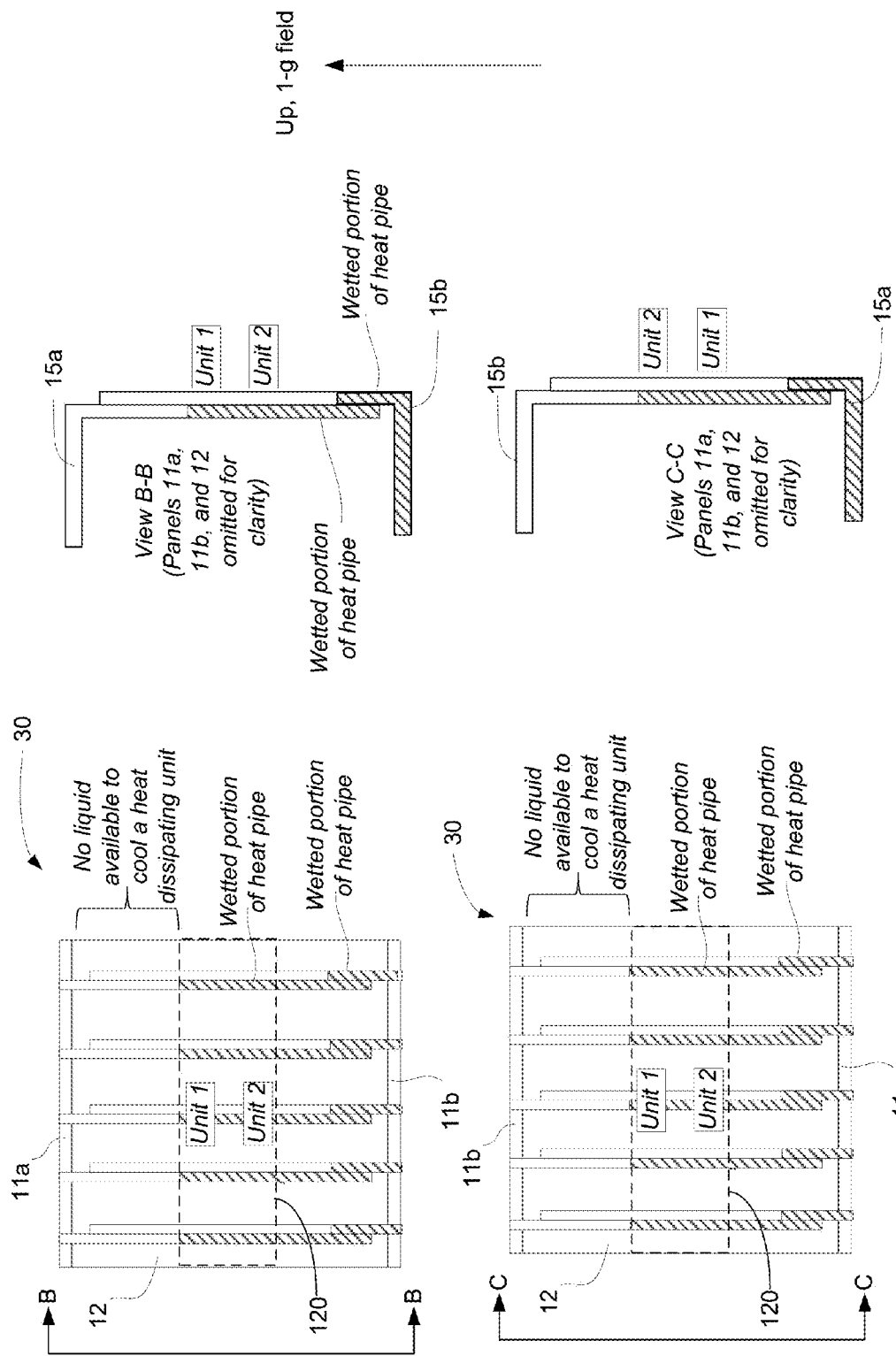
FIG. 2 illustrates further typical features of a known spacecraft radiator system.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific examples of embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

Figure 3:
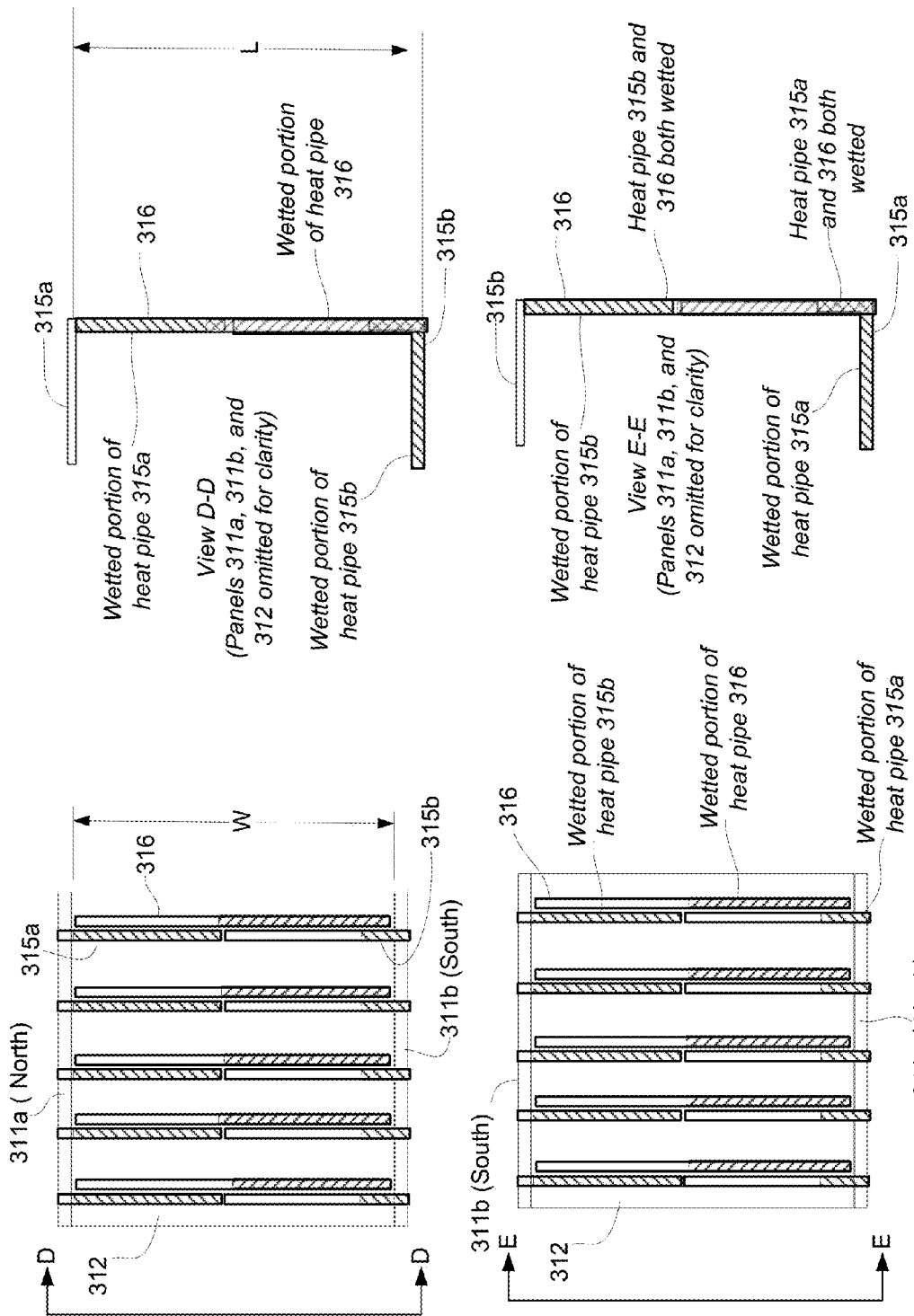
FIG. 3 illustrates an example of a heat pipe radiator system according to an embodiment.

Referring now to FIG. 3, an illustrative example of an embodiment of the presently disclosed techniques will be described. Transverse panel 312 may be coupled at a first edge with a first radiator panel 311a (the "North" radiator panel in some implementations), and coupled at a second edge to a second radiator panel 311b (the "South" radiator panel in some implementations). Transverse panel 312 may be substantially orthogonal to the first radiator panel 311a and the second radiator panel 311b. Transverse panel 312 may have a width, W, extending between the first edge and the second edge.

A first heat pipe 315a may be substantially L-shaped and may have a first section parallel and proximate to the first radiator panel 311a and a second section parallel and proximate to the transverse panel 312. Advantageously, heat pipe 315a may be configured to couple heat between the first radiator panel 311a and the transverse panel 312. A second heat pipe 315b may have a first section parallel and proximate to the south radiator panel 311b and a second section parallel and proximate to the transverse panel 312. Advantageously, heat pipe 315b may be configured to couple heat between the second radiator panel 311b and the transverse panel 312. A third heat pipe 316 may be disposed proximate to and parallel with the transverse panel, the second section of the first heat pipe 315a, and the second section of the second heat pipe 315b. Advantageously, the third heat pipe 316 has a length, L, substantially greater than W/2. In some implementations, the length L may be approximately equal to W. In some implementations, the second section of the pipe 315a and the second section of heat pipe 315b may each have a length of approximately L/2. Advantageously, the third heat pipe 316 may be thermally coupled with each of the second section of the first heat pipe 315a and the second section of the second heat pipe 315b. In some implementations an internal volume of the first section of the pipe 315a, the second section of pipe 315a, the first section of heat pipe 315b, and the second section heat pipe 315b may each be approximately equal.

As indicated above, each heat pipe may be configured to contain a heat transfer fluid that is partially in a liquid state and partially in a gaseous state. Accordingly, at least a first wetted portion of the first heat pipe 315a, a second wetted portion of the second heat pipe 315b and a third wetted portion of the third heat pipe 316 has fluid in the liquid state. Referring still to FIG. 3, wetted portions of each heat pipe are indicated by cross-hatching. In a 1-g field, as illustrated, wetted portions may be located predominantly in the lower portions of each respective heat pipe. More particularly, referring now to view D-D of FIG. 3, it may be observed that when north radiator panel 311a is vertically above south radiator panel 311b, the wetted portion of heat pipe 315a includes substantially all of the second section of heat pipe 315a. It may be further observed that the wetted portion of heat pipe 315b includes substantially all of the first section of heat pipe 315b, and that a substantial portion of the second section of the pipe 315b is not wetted. Finally, it may be noted that a lower portion of heat pipe 316 is wetted.

Referring now to view E-E of FIG. 3, it may be observed that when south radiator panel 311b is vertically above south radiator panel 311a, the wetted portion of heat pipe 315b includes substantially all of the second section of heat pipe 315b. It may be further observed that the wetted portion of heat pipe 315a includes substantially all of the first section of heat pipe 315a, and that a substantial portion of the second section of the pipe 315a is not wetted. Finally, it may be noted that a lower portion of heat pipe 316 is wetted.

According to the presently disclosed techniques, advantageously, substantially all of transverse panel 312 may be proximate to at least one of the first wetted portion, the second wetted portion and the third wetted portion, even in a 1-g field, irrespective of whether the spacecraft is disposed in a 1-g environment, even with the north radiator panel 311a or the south radiator panel 311b in an uppermost position. As a result, a heat dissipating unit may be disposed at substantially any position on transverse panel 312 between north radiator panel 311a and south radiator panel 311b. Advantageously, one or more heat dissipating units may be disposed substantially outboard of a central portion of the transverse panel 312 while still permitting the spacecraft to be tested, with the heat dissipating unit operating, in a 1-g field. Advantageously, as a result of the presently disclosed techniques, such a heat dissipating unit may always be proximate to a wetted portion of a heat pipe, irrespective of an orientation of the spacecraft in the 1-g field. More particularly, the heat dissipating unit may always be proximate to a wetted portion of a heat pipe notwithstanding that the heat pipe may be vertical or at some other substantial inclination to horizontal. As a result, the heat dissipating unit may be safely operated, even when there is a substantial vertical distance separating the first radiator panel from the second radiator panel. The heat dissipating units may include one or more of a low noise amplifier, an up converter, and a down converter, or are other payload or bus equipment.

It will be appreciated that, in an on-orbit configuration, transverse panel 312 may be orthogonal to or parallel to the yaw axis of the spacecraft. For example, where radiator panel 311a is a North facing panel and radiator panel 311b is a South facing panel, the yaw axis of the spacecraft may be parallel to and substantially equidistant from radiator panel 311a and radiator panel 312b. In such case, transverse panel 312 may, in some implementations, be disposed in parallel with the yaw axis (in which case it may be referred to as East/West panel). Alternatively or in addition transverse panel 312 may, in some implementations, be disposed orthogonal to the yaw axis (in which case it may be referred to as Earth/anti-Earth panel).

In some implementations one or more of panel 311a, panel 311b, and panel 312 may include a honeycomb core sandwiched between respective inner and outer face skins. In such implementations, for example, at least sections of heat pipes 315a, 315b, at 316 may be embedded between the inner and outer face skins.

Figure 4A:
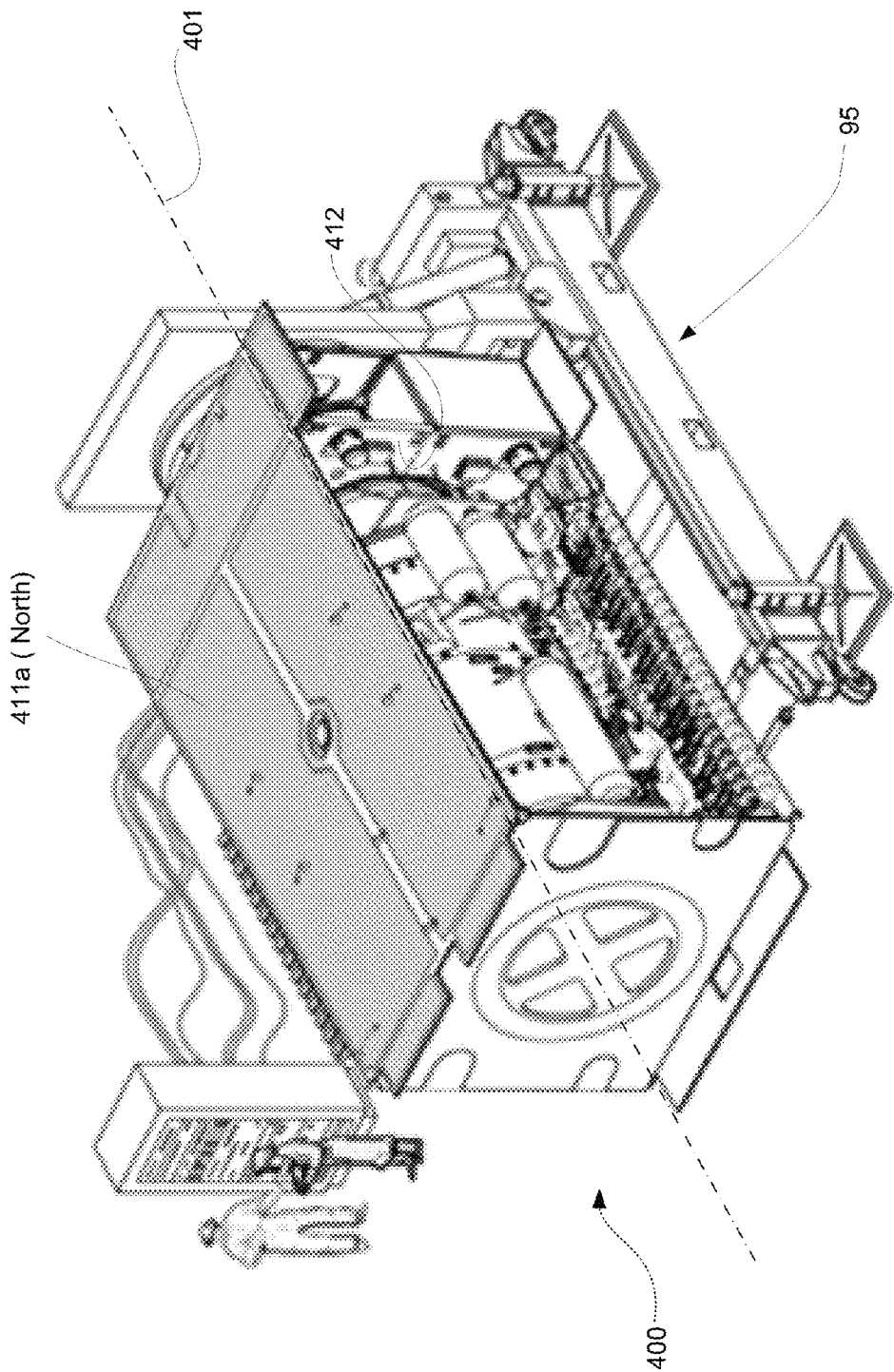
FIGS. 4A and 4B illustrate an example of a spacecraft configured with a crossing heat pipe radiator arrangement according to an embodiment.

A better understanding of features and benefits of the presently disclosed techniques may be obtained by referring now to FIG. 4, which illustrates assembly and test of a spacecraft 400 in a manufacturing environment. Referring first to FIG. 4A, spacecraft 400 is illustrated as being configured for test operation while being supported by mechanical aerospace ground equipment (MAGE) 95. In the illustrated configuration, spacecraft 400 may be said to be oriented in the horizontal position, by which is meant that the yaw axis 401 of the spacecraft 400 is horizontal. In the illustrated configuration, the radiator panel 411a, which may be referred to as the North radiator panel is horizontal and positioned above radiator panel 411b (not illustrated). Transverse panel 412 is vertical in the illustrated configuration. It will be appreciated that, during the course of spacecraft integration and test, functional testing of various spacecraft components, including heat dissipating units disposed on transverse panel 412, may be required with spacecraft 400 oriented in and a number of various positions of which the illustrated configuration is merely an example.

Figure 4B:
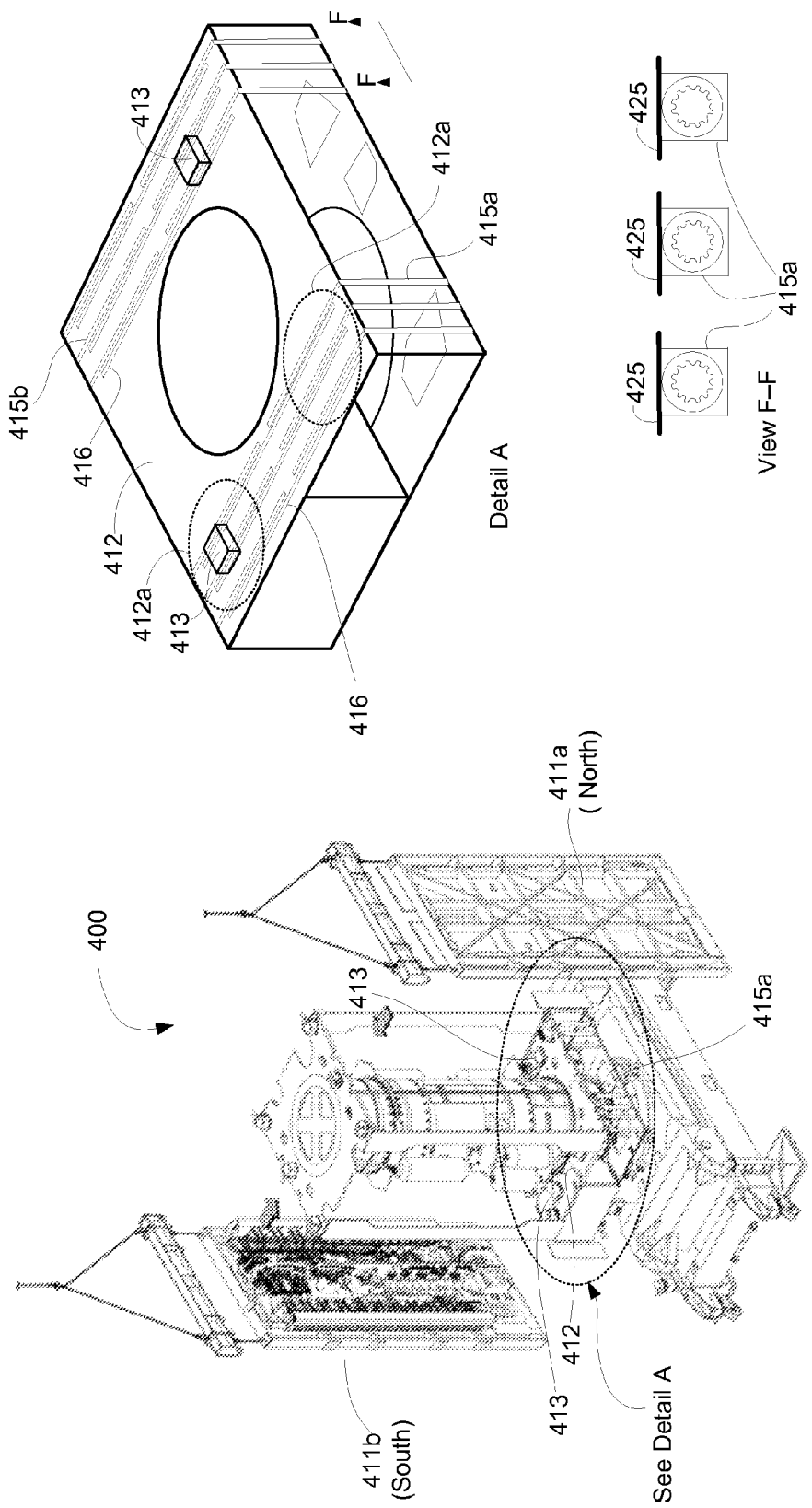

Referring now to FIG. 4B, spacecraft 400 is illustrated in an exploded isometric view. In the illustrated configuration, transverse panel 412 is horizontal, whereas each of North radiator panel 411a and south radiator panel 411b is vertical. Detail A of FIG. 4B illustrates an arrangement of a number of first heat pipes 415a, second heat pipes 415b, and third heat pipes 416, according to an implementation. Each first heat pipe 415a has a first section perpendicular to transverse panel 412. Similarly, each second heat pipe 415b has a first section (not illustrated) perpendicular to transverse panel 412. In the illustrated implementation, each first heat pipe 415a and second heat pipe 415b has a second section embedded within transverse panel 412. In the illustrated implementation, third heat pipe 416 is disposed proximate to and in parallel with the second section of first heat pipe 415a and the second section of second heat pipe 415b. Advantageously, the third heat pipe 416 may be thermally coupled to the second section of the first heat pipe 415a and to the second section of the second heat pipe 415b.

According to the presently disclosed techniques, advantageously, substantially all of transverse panel 412 will be proximate to at least one of the first wetted portion of at least one of heat pipes 415a, 415b, and 416, even in a 1-g field, irrespective of how transverse panel 412 is disposed in a 1-g environment. As a result, a heat dissipating unit 413 may be disposed at substantially any position on the transverse panel 412 between the north radiator panel 311a and the south radiator panel 311b. For example, one or more heat dissipating units 413 may be disposed in a region 412a proximate to the North radiator panel 411a. Similarly, one or more heat dissipating units 413 may be disposed in a region 412b proximate to the South radiator panel 411b while still permitting the spacecraft 400 to be tested, with the heat dissipating unit operating, in a 1-g field. As a result, the heat dissipating unit 413 may be safely operated, irrespective of whether heat pipes 415a, 415b, and 416 are substantially inclined with respect to horizontal. The heat dissipating units 413 may include one or more of a low noise amplifier, an up converter, and a down converter, or other payload or bus equipment, for example. The heat dissipating units 413 may be disposed on a front (forward) surface of the transverse panel 412, on a rear (aft) surface of the transverse panel 412, or on both the forward and aft surfaces of the transverse panel 412.

In the illustrated implementation, each third heat pipe 416 is embedded within transverse panel 412, and is substantially coplanar with each second section of heat pipe 415a and with each second section of heat five 415b. It will be appreciated, however, that one or more of the heat pipe 416, second section of the heat pipe 415a, and second section of the heat five 415b may be disposed on a surface of the transverse panel 412, rather than embedded within the transverse panel 412.

Referring now to view F-F of FIG. 4B, in some implementations, a first section of the first heat pipe 415a and/or first section of the second heat pipe 415b may include a flange 425. The flange 425, which may be thermally coupled with heat pipe 415a, for example, may likewise be configured to be thermally coupled with the face skin of North radiator panel 411a.

In accordance with the presently disclosed techniques, a bore diameter of third heat pipe 416 may be the same as or different than a bore diameter of heat pipe 415a or heat pipe 415b.

Figure 5:
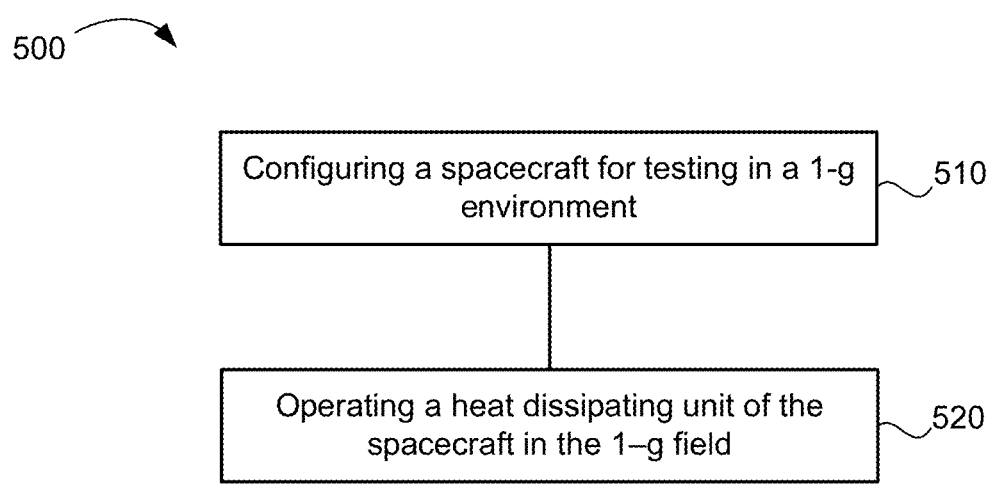
FIG. 5 illustrates a method for testing a spacecraft.

Referring now to FIG. 5, a method for testing spacecraft in a 1-g field will be described. The method 500 may include a step 510 of configuring spacecraft for testing in a 1-g environment. Advantageously, the spacecraft may include, as described above, two substantially parallel radiator panels and a transverse panel coupled therebetween. The two L-shaped heat pipes may be disposed such that a first heat pipe has a first section parallel and proximate to a first radiator panel and a second section parallel and proximate to the transverse panel and a second heat pipe has a first section parallel and proximate to a second radiator panel and a second section parallel and proximate to the transverse panel. A third heat pipe may be disposed proximate and parallel to the transverse panel, the second section of the first heat pipe, and the second section of the second heat pipe. A heat dissipating unit is disposed on a first surface of the transverse panel, proximate to the first radiator panel or the second radiator panel.

Step 510 may include orienting the spacecraft such that the third heat pipe is substantially inclined with respect to horizontal. For example, in some implementations the spacecraft may be oriented such that a yaw axis of the spacecraft is approximately horizontal and longitudinal axis of the third heat pipe is substantially inclined with respect to horizontal, and a substantial vertical distance separates the first radiator panel from the second radiator panel. As a further example in some implementations, the spacecraft yaw axis may be approximately horizontal, with the spacecraft oriented about the yaw axis such that each of the first radiator panel and the second radiator panel is also approximately horizontal, one of the first radiator panel and the second radiator panel being directly above the other radiator panel.

At step 520, a heat dissipating unit of the spacecraft may be operated in the 1-g field. The heat dissipating unit may include one or more of a low noise amplifier, an up converter, and a down converter, for example. Advantageously, as a result of the above-described spacecraft configuration, substantially all of the transverse panel may be proximate to at least one wetted portion of a heat pipe section, and the heat dissipating unit may be safely operated the 1-g environment irrespective of where on the transverse panel the heat dissipating unit is disposed.

Thus, an improved spacecraft radiator system that permits safe operation of heat dissipating units in a 1-g environment irrespective of an orientation of the spacecraft has been disclosed.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
    a first radiator panel, the first radiator panel including a first inner panel surface and heat dissipating units mounted to the first inner panel surface;
    a second radiator panel, substantially parallel to the first radiator panel, the second radiator panel including a second inner panel surface and heat dissipating units mounted to the second inner panel surface;
    a transverse panel coupled at a first edge with the first radiator panel, and coupled at a second edge to the second radiator panel, the transverse panel being substantially orthogonal to the first radiator panel and the second radiator panel and having a width, W, between the first edge and the second edge;
    a plurality of heat dissipating units disposed on at least a first surface of the transverse panel, at least one of the heat dissipating units being disposed proximate to the first radiator panel or the second radiator panel;
    a first heat pipe having a first section parallel and proximate to the first radiator panel and a second section parallel and proximate to the transverse panel;
    a second heat pipe having a first section parallel and proximate to the second radiator panel and a second section parallel and proximate to the transverse panel;
    a third heat pipe, proximate and parallel to the transverse panel, the second section of the first heat pipe, and the second section of the second heat pipe; wherein
    the third heat pipe has a length, L, substantially greater than W/2.

2. The spacecraft of claim 1, wherein:
    each heat pipe is configured to contain a heat transfer fluid that is partially in a liquid state and partially in a gaseous state;
    each of a first wetted portion of the first heat pipe, a second wetted portion of the second heat pipe and a third wetted portion of the third heat pipe has fluid in the liquid state; and substantially all of the transverse panel is proximate to at least one of the first wetted portion, the second wetted portion and the third wetted portion.

3. The spacecraft of claim 2, wherein each of the second section of the first heat pipe and the second section of the second heat pipe is approximately L/2 in length.

4. The spacecraft of claim 1, wherein L is approximately equal to W.

5. The spacecraft of claim 1, wherein the transverse panel encloses one or more of the second section of the first heat pipe, the second section of the second heat pipe, and the third heat pipe.

6. The spacecraft of claim 1, wherein the transverse panel encloses each of the second section of the first heat pipe, the second section of the second heat pipe, and the third heat pipe.

7. The spacecraft of claim 1, wherein the plurality of heat dissipating units includes one or more of a low noise amplifier, an up converter, and a down converter.

8. A spacecraft comprising:
   a first radiator panel, the first radiator panel including a first inner panel surface and heat dissipating units mounted to the first inner panel surface;
   a second radiator panel, substantially parallel to the first radiator panel, the second radiator panel including a second inner panel surface and heat dissipating units mounted to the second inner panel surface;
   a transverse panel coupled at a first edge with the first radiator panel, and coupled at a second edge to the second radiator panel, the transverse panel being substantially orthogonal to the first radiator panel and the second radiator panel and having a width, W, between the first edge and the second edge;
   a plurality of heat dissipating units disposed on at least a first surface of the transverse panel, at least one of the heat dissipating units being disposed proximate to the first radiator panel or the second radiator panel;
   a first heat pipe having a first section parallel and proximate to the first radiator panel and a second section parallel and proximate to the transverse panel;
   a second heat pipe having a first section parallel and proximate to the second radiator panel and a second section parallel and proximate to the transverse panel;
   a third heat pipe, proximate and parallel to the transverse panel, the second section of the first heat pipe, and the second section of the second heat pipe; wherein
   the third heat pipe has a length, L, substantially greater than W/2.

9. The spacecraft of claim 1, wherein the spacecraft is configured to be tested in a 1-g field irrespective of whether the third heat pipe is substantially inclined with respect to horizontal.

10. The spacecraft of claim 1, wherein the transverse panel is orthogonal to a yaw axis of the spacecraft.

11. The spacecraft of claim 1, wherein the transverse panel is parallel to a yaw axis of the spacecraft.

12. A method of testing a spacecraft, the spacecraft including at least one heat dissipating unit, the method comprising:
   configuring the spacecraft for testing in a 1-g environment, wherein the spacecraft further includes:
      a first radiator panel, the first radiator panel including a first inner panel surface and heat dissipating units mounted to the first inner panel surface;
      a second radiator panel, substantially parallel to the first radiator panel, the second radiator panel including a second inner panel surface and heat dissipating units mounted to the second inner panel surface;
      a transverse panel coupled at a first edge with the first radiator panel, and coupled at a second edge to the second radiator panel, the transverse panel being substantially orthogonal to the first radiator panel and the second radiator panel and having a width, W, between the first edge and the second edge;
      a first heat pipe having a first section parallel and proximate to the first radiator panel and a second section parallel and proximate to the transverse panel;
      a second heat pipe having a first section parallel and proximate to the second radiator panel and a second section parallel and proximate to the transverse panel;
      a third heat pipe, proximate and parallel to the transverse panel, the second section of the first heat pipe, and the second section of the second heat pipe;
      the heat dissipating unit is disposed on a first surface of the transverse panel, proximate to the first radiator panel or the second radiator panel; and
   configuring the spacecraft for testing in a 1-g environment includes orienting the spacecraft such that the third heat pipe is substantially inclined with respect to horizontal; and
   operating the heat dissipating unit in 1-g field.

13. The method of claim 12, wherein the third heat pipe has a length, L, substantially greater than W/2.

14. The method of claim 12, wherein:
   each heat pipe is configured to contain a heat transfer fluid that is partially in a liquid state and partially in a gaseous state;
   each of a first wetted portion of the first heat pipe, a second wetted portion of the second heat pipe and a third wetted portion of the third heat pipe has fluid in the liquid state; and
   substantially all of the transverse panel is proximate to at least one of the first wetted portion, the second wetted portion and the third wetted portion.

15. The method of claim 12, wherein the transverse panel encloses each of the second section of the first heat pipe, the second section of the second heat pipe, and the third heat pipe.

16. The method of claim 12, wherein the heat dissipating unit includes one or more of a low noise amplifier, an up converter, and a down converter.

* * * * *